US007179637B2

(12) United States Patent
Feygin et al.

(10) Patent No.: US 7,179,637 B2
(45) Date of Patent: *Feb. 20, 2007

(54) APPARATUS AND METHOD FOR USING INTESTINAL SEGMENTS OR THEIR SUBSTITUTES IN HIGH-THROUGHPUT ANALYSIS OF COMPOUND ABSORPTION

(75) Inventors: Ilya Feygin, Mountainside, NJ (US); Rafail Kushak, Brookline, MA (US)

(73) Assignee: TechElan, LLC, Mountainside, NJ (US)

( * ) Notice: Subject to any disclaimer, the term of this patent is extended or adjusted under 35 U.S.C. 154(b) by 622 days.

This patent is subject to a terminal disclaimer.

(21) Appl. No.: 10/225,057

(22) Filed: Aug. 21, 2002

(65) Prior Publication Data

US 2003/0104610 A1   Jun. 5, 2003

Related U.S. Application Data

(63) Continuation-in-part of application No. 10/139,766, filed on May 6, 2002.

(60) Provisional application No. 60/334,332, filed on Nov. 29, 2001.

(51) Int. Cl.
*C12M 3/00* (2006.01)

(52) U.S. Cl. .............................. 435/284.1; 435/293.1; 435/297.2; 435/297.5; 210/321.78; 73/64.47; 623/915; 623/917

(58) Field of Classification Search ............. 435/284.1, 435/297.5; 73/64.47; 210/321.78
See application file for complete search history.

(56) References Cited

U.S. PATENT DOCUMENTS

| 3,590,634 | A | | 7/1971 | Pasternak et al. |
| 3,980,250 | A | * | 9/1976 | Persson .................... 242/129.5 |
| 4,744,900 | A | * | 5/1988 | Bratt ...................... 210/321.78 |
| 4,889,626 | A | * | 12/1989 | Browne ...................... 210/359 |
| 4,911,713 | A | * | 3/1990 | Sauvage et al. .............. 600/36 |
| 5,183,760 | A | | 2/1993 | Sweetana et al. |
| 5,591,636 | A | | 1/1997 | Grass |
| 5,738,826 | A | | 4/1998 | Lloyd |
| 6,521,191 | B1 | | 2/2003 | Schenk et al. |
| 2003/0104610 | A1 | | 6/2003 | Feygin et al. |
| 2003/0199096 | A1 | * | 10/2003 | Feygin et al. ................... 436/8 |

* cited by examiner

*Primary Examiner*—William H. Beisner
(74) *Attorney, Agent, or Firm*—DeMont & Breyer, LLC (57) ABSTRACT

An apparatus for high-throughput analysis of compound absorption in a controlled environment that closely resembles in-vivo conditions. The apparatus includes at least one tissue-receiving enclosure that is capable of interfacing (e.g., via transfer of fluids, electronically, etc.) with a variety of preparative devices and analytical instrumentation. In some variations, the tissue-receiving enclosure is formed from two housings, which, when engaged, have a capsular shape. The enclosure receives a tissue sample in the form of an un-everted or everted intestinal segment or tubular artificial membrane. The tissue sample is coupled to a generally cylindrical tissue support. The tissue support and the enclosure are axially aligned, and openings at the ends of the enclosure align with openings at the ends of the tissue support. Two feed fittings, one for each end of the enclosure, forcefully mate with the aligned openings in the housing and the tissue support. The feed fitting seals against the ends of the tissue support, forming "outer" and "inner" chambers within the enclosure, with the intestinal tissue being the interface between the chambers. It is across this interface that absorption occurs.

12 Claims, 3 Drawing Sheets

APPARATUS AND METHOD FOR USING INTESTINAL SEGMENTS OR THEIR SUBSTITUTES IN HIGH-THROUGHPUT ANALYSIS OF COMPOUND ABSORPTION

STATEMENT OF RELATED CASES

This application is a continuation in part of U.S. patent application Ser. No. 10/139,766 filed May 6, 2002, which, in turn, claims priority of U.S. Prov. Pat. App. Ser. No. 60/334,332 filed Nov. 29, 2001. Both of these applications are incorporated herein by reference.

FIELD OF INVENTION

The present invention relates to high-throughput investigation and screening of compound interactions with intestinal tissue.

BACKGROUND OF THE INVENTION

Aggressive research in genomics, functional proteomics and drug discovery has resulted in a large increase in the number of chemical entities ("leads") that have a potential for therapeutic activity. The leads are typically pruned in "pre-clinical screening" studies to select promising candidates for final "clinical studies." Due to the large number of leads to be screened, the pre-clinical screening process has become a bottleneck in the drug discovery process.

During pre-clinical screening, sequential pharmacological transformations of the leads, in conjunction with an organism (e.g., cells, tissues, model animals, etc.,) are evaluated. The evaluation that is typically performed during pre-clinical screening is known as "ADMET" or sometimes "ADME Tox," which is an acronym for Absorption, Distribution, Metabolism, Excretion and Toxicology. The absorption properties of leads are particularly important, and, as discussed later in this section, are particularly problematic to test.

There are generally two approaches to the pre-clinical screening of leads—in vivo testing and in vitro testing using artificial membranes (immobilized artificial membranes) or cell-based permeability methods. In vivo testing is performed within a living organism, while in vitro testing is performed outside of a living organism. Of these two approaches, in vivo testing provides a more accurate analysis of compound absorption and bio-availability during pre-clinical pharmaco-kinetic studies. Unfortunately, the logistics of animal-based studies makes them extremely expensive and time consuming. Furthermore, in vivo studies cannot provide the speed necessary to support high-throughput screening of drug candidates. Even the recently developed "cassette method," wherein multiple compounds (about five to ten) are combined and administered to a single animal, cannot provide the desired productivity. (See, J. Berman et al., J. Med. Chem. 40:827–829 (1997); Dietz et al., U.S. Pat. No 5,989,918.)

Consequently, the focus in high-throughput screening of drug candidates is on various in vitro techniques (and even computer "in silico" modeling methods). Unfortunately, absorption is a difficult process to model and evaluate using in vitro testing. Specifically, absorption deals with the transport of compounds through live membranes (e.g., tissues, etc.)—a situation that is difficult to re-create outside of a living organism under test conditions. The successful application of in vitro models to the study of compound (e.g., drugs, nutrients, nutraceuticals, xenobiotics, etc.) transport across the intestinal mucosa therefore depends on how close those models imitate the characteristics of tissue in vivo.

A variety of in vitro methods have been developed to mimic the characteristic of the intestinal mucosa. One of the first methods that was developed for in vitro absorption studies is the everted sac technique (T. H. Wilson & G. Wiseman. J. Physiol. 123:116–125 (1954)).

In the everted sac technique, a segment of intestine (2–3 centimeters in length) is everted (i.e., turned inside out). The segment is filled with oxygenated buffer solution (serosal solution) and tied at both ends. The everted sac is placed in a similar buffer solution (mucosal solution) and incubated at body temperature with continuous oxygenation. The main reason for everting the segment is to ensure that the intestinal mucosa are adequately oxygenated, which is necessary for viability. The compound under study can be added to either the mucosal solution (on the outside) or the serosal solution (on the inside) depending on what kind of transport is being studied (mucosa→serosal or serosa→mucosal). After incubation is complete, the concentration of the transported compound is estimated in the serosal solution or on both sides of the intestine and in the intestinal mucosa.

This simple, reproducible, and inexpensive method is used for studying various mechanisms of compound uptake and transport through the intestine at its various regions as well as compound metabolism by intestinal mucosa (E. S. Foulkes. Proc. Soc. Exper. Biol. Med. 211:155–162 (1996)). The everted sac technique is also useful for studying the activity of the intestinal cell excretion system—P-glycoprotein—by comparing compound absorption in the presence and absence of P-glycoprotein inhibitors as well as in the presence of absorption enhancers and inhibitor screening (K. Hillgren et al., Med. Res. Rev. 15:83–109 (1995); L. Barthe et al., Fundam. Clin. Pharmacol. 13:154–168 (1999)).

Its utility notwithstanding, the everted sac technique has some disadvantages. One notable disadvantage is the animal origin of the intestine. Additional disadvantageous include low tissue viability and rapid histological damage in salt mixtures. Everted sacs look normal after inversion; however, studies have found that after 5 minutes of incubation at 37° C. morphological changes occur and after 30 minutes, 50–70% of epithelial cells were distorted (R. R. Levine et al., Eur. J. Pharm. 9:211–219 (1970)).

There are many modifications of everted sac technique. A recent modification proposed using tissue-cell medium instead of simple salt solutions for tissue incubation (L. Barthe et al., Europ. J. Drug Metab. Phatmacokinet. 23:313–323 (1998)). But these complex mixtures can be used in absorption studies only for a limited number of compounds.

Another serious drawback of the everted sac technique is that the serosal compartment is closed and cannot be properly oxygenated during incubation. While perhaps appropriate for short-term studies, the lack of proper oxygenation might cause problems for the evaluation of molecule kinetics during longer studies or when investigating compounds with a high absorption rate. Insufficient serosal oxygenation might also be a reason for low tissue viability because well-oxygenated intestinal tissue perfused with buffer solution remains viable for several hours (G. Parson & C. R. Paterson. J. Exper. Physiol. 50:220 (1965)).

Proper oxygenation of intestinal tissue from both the mucosal and serosal sides not only increases tissue viability but also affects compound absorption rate. In tests, everted sacs of rat intestine that have been filled with oxygen and incubated in oxygenated mucosal solution have exhibited a two-fold increase in glucose uptake compared with sacs that are oxygenated only from the mucosal surface (L. G. Ekkert & A. M. Ugolev. Gen. Physiol. Biophys. 2:141–157 (1982)).

Further drawbacks of the everted sac technique are that it is a manual technique and cannot support high-throughput compound screening or provide programmable operations with ease of setup and control functions.

A need remains for a technique and device that uses intestinal tissue for high-speed screening of compound absorption and that provides at least some of the following advantageous characteristics:
1. High-throughput screening ("HTS") with low cost of preparation, operation and maintenance.
2. High-content screening ("HCS"), which enables multiple in-process sampling and testing that is necessary, for example, for kinetic studies.
3. Provides an ability to use live, un-everted intestinal segments as well as everted segments for absorption studies.
4. Provides an ability to use artificial membranes as necessary or desirable.
5. Preserves tissue viability and a high absorption rate due to bilateral oxygenation.
6. Preserves tissue viability by accelerating test procedures, including one or more of the tasks of loading, conditioning, and testing.
7. Provides an ability to use un-everted intestinal segments or artificial membranes for perfusion studies to imitate intestinal motility.
8. Maintains in vitro conditions that closely match in vivo conditions (e.g., pH, temperature, etc.) and the ability to monitor, control and alter these conditions.

SUMMARY OF THE INVENTION

Among other capabilities, the illustrative embodiment of the present invention provides high-throughput and high-content investigation of compound interactions with intestinal tissue during compound absorption and related processes. More particularly, the illustrative embodiment of the invention is useful for studying, without limitation:
1. The mechanism of compound transport through intestinal tissue.
2. The mechanism of compound uptake (accumulation) in intestinal tissue.
3. The kinetics of compound uptake and transport through intestinal tissue.
4. The cell excretion system: P-glycoprotein expression in intestinal tissue
5. Trans-membrane current and potential.
6. The effect of absorption inhibitors and enhancers.
7. Pharmacologic antagonism in toxicity studies.
8. Various compound (e.g., nutrients, drugs, nutraceuticals, cosmetics, cosmeceuticals, other xenobiotics) interactions during their absorption.

The compound interactions occur in a controlled environment that closely resembles in-vivo conditions. The invention facilitates the development of new compounds (e.g., drugs, nutrients, nutraceuticals, cosmetics, cosmeceuticals, etc.) as well as toxicological evaluation of xenobiotics.

An apparatus for high-throughput analysis in accordance with the illustrative embodiment includes at least one tissue-receiving enclosure that is capable of interfacing (e.g., via transfer of fluids, electronically, etc.) with a variety of preparative devices and analytical instrumentation. The enclosure receives a tissue sample in the form of an un-everted or everted intestinal segment or tubular artificial membrane, with or without cells attached or covered with a lipid bilayer. The intestinal segment or membrane is usually coupled to a tissue support.

In some variations, the tissue-receiving enclosure is formed from two housings that are configured to engage one another. In the illustrative embodiment, each of the housings has a generally cylindrical-shaped body that collapses, at one end, into a dome or hemispherical shape. Each of the housings has a small aperture at the apex of the domed end. The other end of each of the housings terminates in a "large aperture." One of the housings has a slightly smaller diameter than the other housing so that the housing having the smaller diameter can be received into the large aperture of the other. When the two housing are engaged in this fashion, the enclosure has a capsular shape.

The tissue support is generally cylindrical in shape and sized to be inserted within intestinal tissue. The perimeter of the body of the tissue support is predominantly open area to provide access to the surface of the intestinal tissue. There is an aperture disposed at both ends of the tissue support.

In use, the tissue support is inserted into a segment of intestinal tissue (un-everted or everted) or a substitute and is then placed within the tissue-receiving enclosure. The tissue support and the enclosure are axially aligned so that aperture in the domed end of each housing aligns with respective apertures at the ends of the tissue support. Two feed fittings, one for each end of the enclosure, forcefully mate with the aligned apertures in the housing and the tissue support.

As the feed fitting seals against the ends of the tissue support, two chambers are formed within the enclosure, with the intestinal tissue being the interface between the chambers. It is across this interface that absorption occurs. For un-everted segment, a first "inner" chamber is defined within the mucosal surface of intestinal tissue and the tissue support. A second "outer" chamber is defined between the serosal surface of the intestinal tissue and the inside of the housings. For everted segment, the inner chamber is defined with the serosal surface of the intestinal tissue and the tissue support. The outer chamber is defined between the mucosal surface of the intestinal tissue and the inside of the housings.

The feed fitting is preferably spring-biased, such as by coupling a spring to it. This arrangement provides a number of beneficial features including, among others:
A way to seal the interface between the feed fitting and the housing.
A way to seal the interface between the feed fitting and the tissue support (when intestinal tissue is engaged).
A way to create two chambers within the enclosure.
A way to introduce one or more tubes into the inner and outer chambers (i.e., through the feed fittings). The tubes, which enter the feed fitting bundled within a conduit, support fluid (i.e., liquid and/or gas) exchange between the chambers and the fluid control system.
A way to provide mechanical and fluidic integrity to the entire enclosure.
A way to vent gases from the inner and outer chambers.

The inner and outer chambers are advantageously independently connected to a fluidic-control system by means of conduits and tubes that pass through the feed fitting. The fluidic control system, which is advantageously programmable, individually interconnects the chambers with supply reservoirs and sampling receivers, and/or directly with various analytical instruments and preparative devices. The movement of fluids and gases through the tubes can be controlled by means of pressurization, vacuum or positive-displacement forces. A fluidic control system suitable for use with the tissue-receiving enclosure is described in co-pending U.S. patent application Ser. No. 10/139,766 filed May 6, 2002, and is incorporated by reference herein.

In some variations of the illustrative embodiment, individual chambers are equipped with one or more electrodes for introducing and/or measuring electric potential across the membrane. The electrodes are electrically isolated and introduced into individual chambers through the openings along with the tubes. The electrodes are advantageously terminated with pliable noble metal (e.g., platinum wire, etc.) and can be shaped and located in accordance with the desired function of applying or measuring electrical potentials or currents.

In some variations of the illustrative embodiment, a plurality of tissue-receiving enclosures are mechanically coupled, side-by-side, to a frame. The frame advantageously has two spaced-apart rails against which the springs for each tissue-receiving enclosure are referenced. Since the springs are mechanically coupled to the feed fittings, and the feed fittings are received, in at least some variations, on opposite ends of the enclosure, the enclosure is placed in compression by the opposing springs.

In some variations of the illustrative embodiment, the frame having a plurality of tissue-receiving enclosures is installed into a mother chamber, such as the mother chamber described in co-pending U.S. patent application Ser. No. 10/139,766.

DETAILED DESCRIPTION

The terms listed below are given the following definitions for use in this specification.

Absorption enhancer is a chemical entity (compound) that facilitates the absorption of a tested compound.

Absorption inhibitor is a chemical entity (compound) that inhibits the absorption of a tested compound.

Apical membrane is a part of the cell plasma membrane of polarized cells facing the external environment.

Baso-lateral membrane is a part of the cell plasma membrane covering the base and sides of the polarized cells.

Brush-border membrane is the apical membrane of intestinal epithelial cell.

Communicates means that one element is able to receive information or material from another element. For example, an opening that communicates with a chamber is capable of receiving fluid from or delivering fluid to the chamber.

Cosmeceutical is a cosmetic product whose active ingredients have a beneficial physiological effect in comparison with inert cosmetic. Examples of cosmeceuticals include, without limitation, vitamins, minerals, antioxidants and other biologically-active substances.

Coupled means directly or indirectly connected. In some cases, coupled elements do not physically contact one another. For example, two housings that do not touch one another because they are separated by a gasket, but otherwise collectively form an enclosure, are properly characterized as "coupled" under this definition. In other cases, two elements that are in physical contact with one another are properly characterized as "coupled" for the purpose of this specification.

First-pass metabolism is drug bio-transformation during its passage through the intestinal epithelium. This process can markedly decrease the amount of an administered drug that is actually available to the body.

Incubated means kept at constant conditions such as, for example, temperature, oxygenation, etc.

In vivo refers to biological processes that occur inside the body of a living organism.

In vitro refers to biological processes that occur outside the body (e.g., in a test tube, etc.).

Mechanically coupled means that a first element is capable of imparting a force to a second element, regardless of whether or not the two elements are in physical contact with one another. For example, consider a spring that is connected to a fitting that is, in turn, connected to a housing. It is proper, under this definition, to characterize the spring as being mechanically coupled to the housing.

Mucosa is the moist membrane lining the surface of many tubular structures and cavities including the small intestine. Along with other types of cells, mucosa tissue contains cells that secrete mucus.

Nutraceutical is a nutritional supplement. Examples of nutraceuticals include, without limitation, vitamins, minerals, polyunsaturated fatty acids, antioxidants, probiotics and other biologically active substances.

PAMPA means parallel artificial membrane permeability test.

P-glycoprotein is a membrane-localized drug-transport mechanism that has an ability to actively pump drugs out of a cell.

Pharmacologic antagonism means that one drug opposes the action of another drug (e.g., preventing it from combining with its receptor, etc.).

Serosa is a smooth transparent membrane that lines certain large cavities of the body and that covers some of its organs including intestine.

Synthetic tissue or tissue substitute is a thin layer of artificial membrane having a selected permeability. It is used for compound permeability studies or as a substrate for cell attachment in tissue culture. Examples of synthetic tissue (membranes) include, without limitation, nitrocellulose, nylon, polypropylene, other synthetic polymers, etc.

Xenobiotic is a foreign compound that is toxic, at some dose, to at least some living organisms. Examples of xenobiotics include, without limitation pesticides, herbicides, fungicides, and the like.

Figure 1:
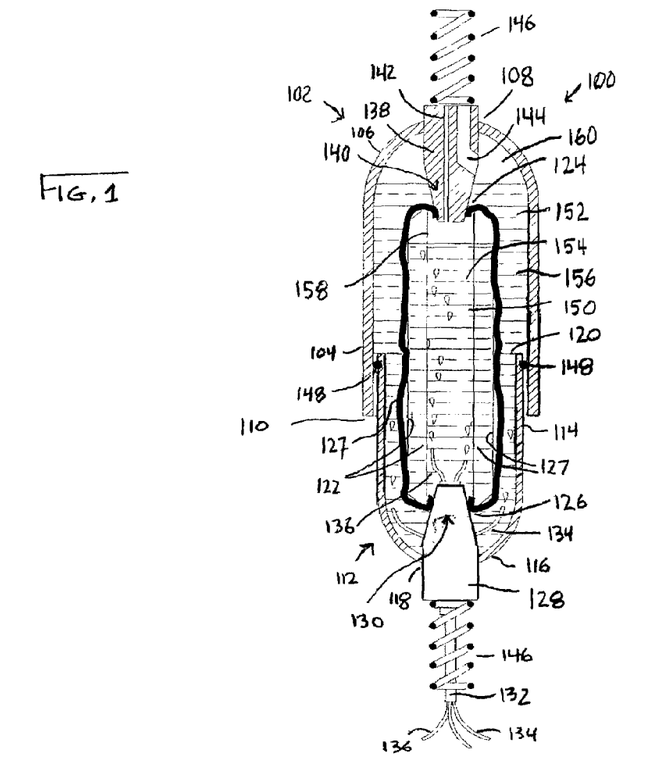
FIG. 1 depicts a cross-section of a tissue-receiving enclosure in accordance with the illustrative embodiment of the present invention.

FIG. 1 depicts a cross-sectional side-view of tissue-receiving enclosure 100. The enclosure is formed from two housings 102 and 112 that are advantageously configured to engage one another. In the illustrative embodiment, each housing 102, 112 has a generally cylindrical-shape body 104, 114 that collapses, at one end, into a dome 106, 116. Each housing 102, 112 has a small aperture 108, 118 at the apex of domed ends 106, 116. The other end of each housing 102, 112 is open terminating in "large aperture" 110, 120.

In the embodiment depicted in FIG. 1, housing 112 has a slightly smaller diameter than housing 102 so that housing 112 can be received into the "larger" large aperture 110 of housing 102. When the two housings are engaged in this fashion, enclosure 100 has a capsular shape, with domed ends 106, 116 of housings 102, 112 defining the ends of enclosure 100.

Figures 2, 3A, 3B, 3C:
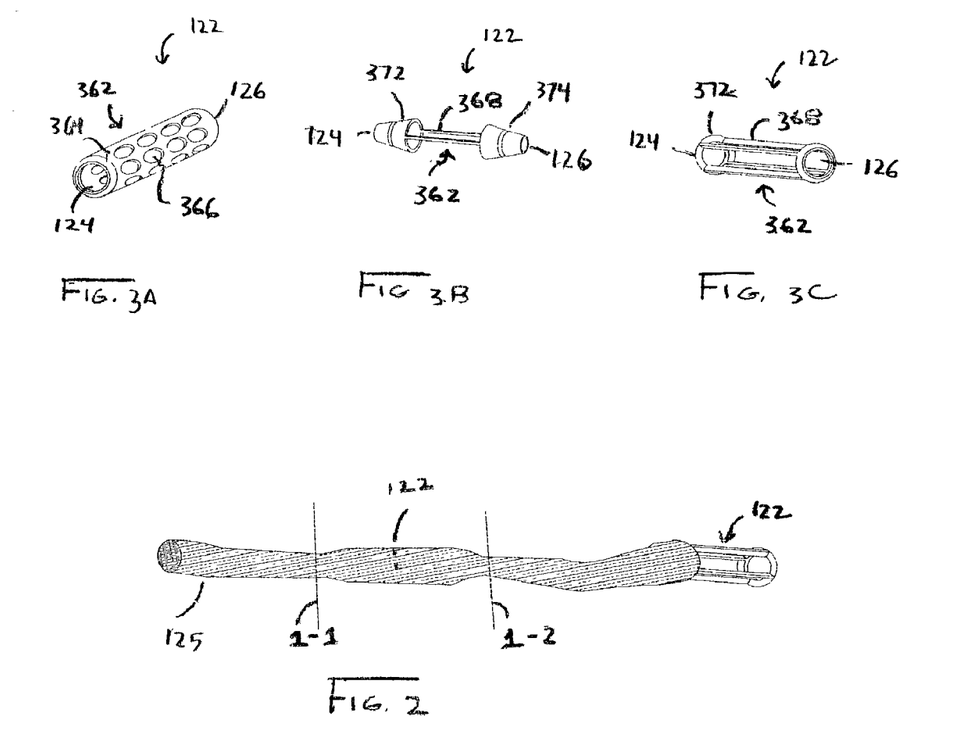
FIG. 2 depicts intestinal tissue with one tissue support inserted and a second being inserted.
FIGS. 3A, 3B and 3C depict variations of a tissue support for use in conjunction with the illustrative embodiment of the present invention.

Within enclosure 100 is tissue support 122 and an overlying segment 127 (un-everted or everted) of intestinal tissue (small intestine or colon). As depicted in FIG. 2, tissue support 122 is appropriately sized for insertion into a segment of intestine. Consequently, the diameter of tissue support 122 can vary significantly as a function of the animal from which the intestine is obtained. Generally though, tissue support 122 will have a diameter that is in a range of about 2 mm to 10 mm.

In some variations of the illustrative embodiment, segment 127 is an artificial tubular membrane having a selective permeability. It can be used as is or with cells from a cell-line culture (e.g., Caco-2 cells) attached. In yet some additional variations, segment 127 is a tubular artificial membrane covered with lipid bilayer, such as is used in PAMPA studies of compound permeability.

FIGS. 3A, 3B and 3C depict several versions of tissue support 122. As shown in those Figures, tissue support 122 is generally cylindrical in shape. The perimeter of body portion 362 of the tissue support is configured to provide a significant amount of open area. For example, in the embodiment depicted in FIG. 3A, body portion 362 is realized as wall 364 containing a plurality of openings 366. In FIGS. 3B and 3C, body portion 362 comprises two ribs 368 and four ribs 368, respectively, which depend from end members 372. The variation of tissue support 122 depicted in FIG. 3B has tapered end members and includes groove 374 for receiving an o-ring to secure the intestinal tissue. The open regions of body portion 362 provide access to the inside surface of the section of intestinal segment 127 that is engaged to tissue support 122. Apertures 124 and 126 are disposed at the ends of tissue support 122.

It is notable that when exposed to buffer solution, segment 127 "inflates" such that it does not contact underlying tissue support 122. Consequently, the presence of ribs (see, e.g., FIG. 3C) or otherwise partially occluded sides (see, e.g., FIG. 3A) in tissue support 122 does not prevent access to the full inner surface of the intestinal segment for absorption.

For use in tissue-receiving enclosure 100, intestinal segments 127 are advantageously prepared by inserting tissue supports 122 into intestinal tissue 125 and then sectioning the intestine consistent with the length of the tissue supports. For example, in FIG. 2, intestinal segment 127 is prepared by sectioning at locations 1-1 and 1-2, consistent with the length of tissue support 122 within the intestine. Tissue supports 122 can be produced in a variety of lengths as a function of the desired testing process.

Tissue support 122 with the overlying intestinal segment is inserted into enclosure 100. Tissue support 122 and tissue-receiving enclosure 100 are axially aligned so that aperture 108 (in upper domed end 106) aligns with aperture 124 in tissue support 122. Likewise, aperture 118 (in lower domed end 116) aligns with aperture 126 in tissue support 122. Housings 102 and 112 are sealed against one another with o-ring 148.

Lower feed fitting 128 is snugly received by aperture 118 in lower housing 112 and aperture 126 in tissue support 122. Since aperture 126 is typically smaller than aperture 118, feed fitting 128 has a tapered end 130. Similarly, upper feed fitting 138 having tapered end 140 is snugly received by aperture 108 in upper housing 102 and aperture 124 in tissue support 122.

A spring-biasing element advantageously mechanically couples to each feed fitting 128 and 138. In the illustrative embodiment, the spring-biasing element is holding spring 146; however, other arrangements capable of providing a force that is directed toward tissue-receiving enclosure 100, as are known to those skilled in the art, can suitably be used.

Notably, feed fittings 128 and 138 seal the interior region of tissue support 122 (when an intestinal segment is engaged to it) from the region exterior to the intestinal tissue, thereby defining inner chamber 150 and outer chamber 152. The intestinal tissue is, therefore, the interface between the two chambers and is the interface across which tests, such as absorption tests, are conducted.

Structurally, feed fittings 128 and 138 are advantageously the same. In the illustrative embodiment, feed fittings 128 and 138 both include passageway 142 and passageway 144 (although this internal structure is shown only for feed fitting 138). Notwithstanding this sameness of structure, passageways 142 and 144 serve different purposes as a function of whether the feed fittings are located on the bottom of enclosure 100 or on the top.

In particular, feed fitting 128, located at the bottom of enclosure 100, hermetically accommodates conduit 132 in passageway 142. This conduit advantageously carries a plurality of tubes, such as tubes 134, which enter outer chamber 152 through passageway 144, and tubes 136, which enter inner chamber 150. In conjunction with a fluidic-control system described in co-pending patent application Ser. No. 10/139,766, tubes 134 and 136 are used to introduce and/or withdraw liquid and gases to and from inner chamber 150 and outer chamber 152. For example, in some embodiments, one of the tubes 134 removes fluid from outer chamber 152 while the other tube 134 can introduce fluid into outer chamber 152. Similarly, one of the tubes 136 can be used to remove fluid from inner chamber 150 while the other tube 136 can introduce fluid into it. Although two tubes are depicted entering each of the inner and outer chambers, it will understood that in other variations of the illustrative embodiment, more or fewer than two tubes, as suits a particular application, can enter each chamber. Furthermore, conduit 132 can be used to introduce one or more electrodes (not shown) into the inner or outer chamber.

With regard to feed fitting 138 disposed at the top of enclosure 100, passageways 142 and 144 are used as vents. In particular, passageway 142 vents vapors and gases from inner chamber 150 while passageway 144 vents vapors and gases from outer chamber 152. To that end, vapor space 158 is advantageously present in inner chamber 150 above liquid 154 and vapor space 160 is advantageously present in outer chamber 152 above liquid 156.

Figure 4:
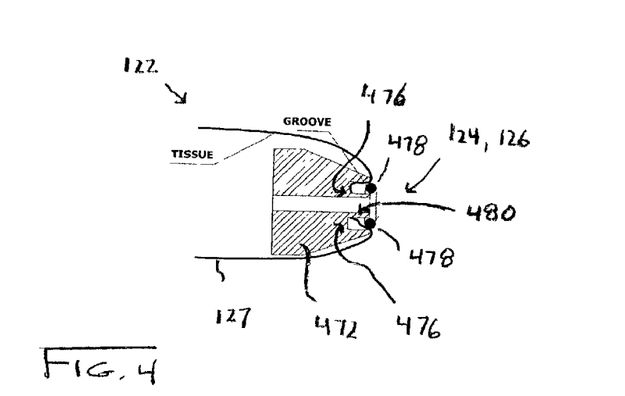
FIG. 4 depicts a cross-sectional view of an intestinal segment attached to a tissue support in an arrangement suitable for use with the feed fitting depicted in FIG. 1.
Figure 5:
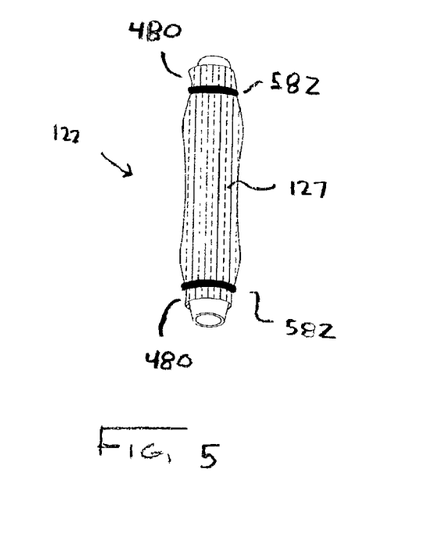
FIG. 5 depicts the tissue support of FIG. 2B inserted into intestinal segment and bound to the tissue support by o-rings.

It will be appreciated by those skilled that it is advantageous to reduce, to a practical minimum, excess intestinal tissue that is not available for testing chamber-to-chamber transport. For example, with reference to FIGS. 1 and 5, it would be undesirable to have end 480 of intestinal segment 127 extending into chamber 152, such as might occur if the tissue support and overlying intestinal tissue that are depicted in FIG. 5 were installed in enclosure 100. Consequently, a tissue support that avoids this situation is advantageously used. FIG. 4 depicts a version of a tissue support that is physically adapted to avoid this problem.

Tissue support 122 depicted in FIG. 4 is a modification of the tissue support depicted in FIG. 3B. End 472 of tissue support 122 includes an annular groove or channel 476 into which the end 480 of intestinal segment 127 (see also, FIG. 1) is forced. O-ring 478 is placed in channel 476 to keep end 480 of intestinal segment 127 secured. This version of tissue support 122 is advantageously used with feed fittings 128 and 138 such as are depicted in FIG. 1.

FIG. 5 depicts the variation of tissue support 122 that is shown in FIG. 3B coupled to intestinal segment 127. O-rings 582 are referenced to grooves 374 (not shown in FIG. 5; see, e.g., FIGS. 3B and 6). Ends 480 of intestinal segment 128 extend somewhat beyond O-rings 582. As previously indicated, it would be undesirable to insert the arrangement depicted in FIG. 5 into enclosure 100 using feed fittings 128 and 138 as depicted in FIG. 1. Consequently, a variation of those feed fittings should be used.

Figure 6:
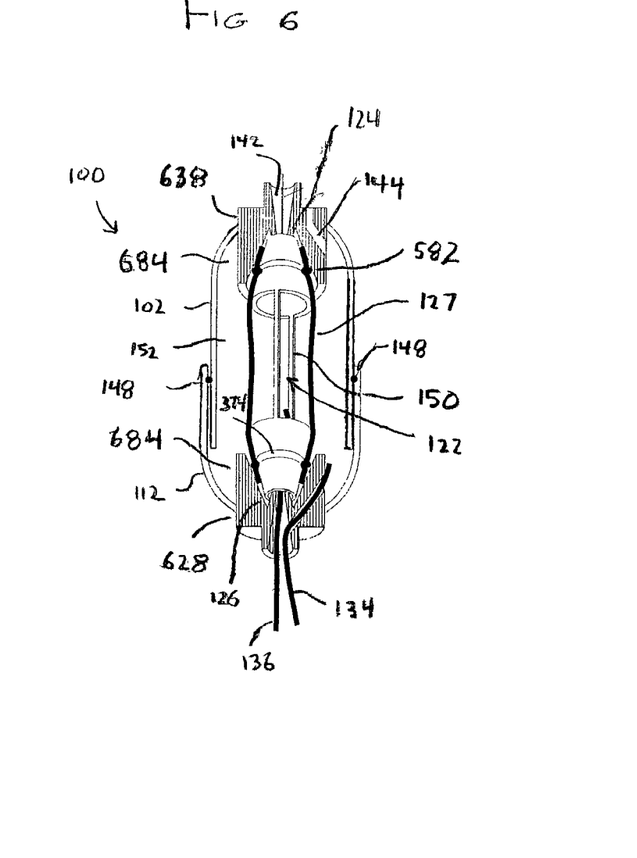
FIG. 6 depicts a cross-sectional perspective view of a tissue-receiving enclosure with a feed fitting having an alternative configuration.

FIG. 6 depicts tissue-receiving enclosure 100 with tissue support 122 and intestinal segment 127 as depicted in FIG. 5. Feed fittings 628 and 638, which are a variation of feed fittings 128 and 138, are used to seal housings 102, 112 and ends 126 and 124 of tissue support 122.

As depicted in FIG. 6, feed fittings 628 and 638 include shroud 684 that seals against o-ring 582 in groove 374. This arrangement prevents any exposure of end 480 of intestinal segment 127 to outer chamber 152. As with feed fittings 128 and 138, feed fittings 628 and 638 include internal passageways 142, 144 that receives a conduit (not shown in FIG. 6) and tubes 134 and 136, or that serve as vents, as previously described.

Figure 7:
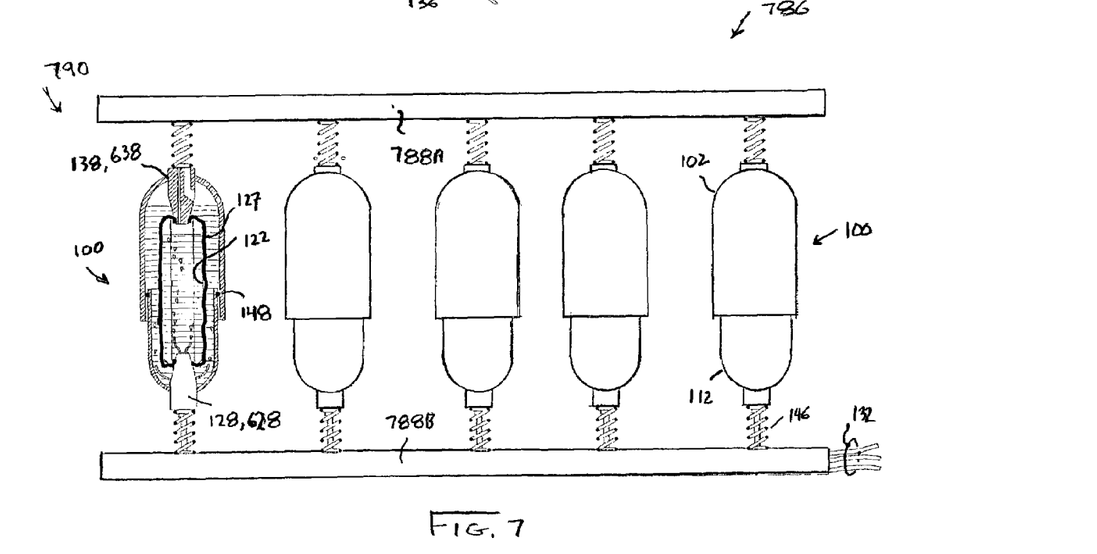
FIG. 7 depicts an array of tissue-receiving enclosures within a frame.

FIG. 7 depicts array 786 of tissue-receiving enclosures 100. While five such enclosures are depicted in FIG. 7, the array can comprise any desired number of enclosures 100. General rules of the biochemical industry usually dictate, however, that this number should be a multiple of eight or twelve for ease of interfacing with multi-well plates.

Each enclosure in array 786 includes upper housing 102, lower housing 112, o-ring 148, tissue support 122, upper feed fitting 138, 638 and lower feed fitting 128, 628, and two spring biasing elements 146. Tissue 127 is shown overlying tissue support 122. Each enclosure 100 is coupled to two spaced-apart rails 788A and 788B that compose frame 790 via the spring biasing elements. To that end, rails 788A and 788B are advantageously physically adapted to receive spring biasing elements 146. For example, the arrangement described in U.S. patent application Ser. No. 10/139,766 can be used wherein each rail includes a plurality of openings. The openings receive a spring-holding extension that depends from each feed fitting. The spring-holding extensions accommodate spring-biasing elements 146. Spring biasing elements 146 are therefore referenced against rails 788A and 788B and, consequently, exert a force that is directed towards enclosures 100. Frame 788B, which couples to the bottom of enclosures 100, advantageously carries conduits 132 which carries the various tubes into each enclosure.

This arrangement, wherein spring-biasing elements, feed fittings, and apertures are all aligned assures the mechanical integrity and hermetic seal of each enclosure 100. Also, the use of spring biasing elements 146 enables the installation of fully assembled individual tissue-receiving enclosures 100 in frame 790.

Array 786 can be disposed inside a mother chamber, as described in U.S. patent application Ser. No. 10/139,766, that provides one or more of the following benefits, among any others:

protects the tissue-receiving enclosures;
provides a fully-controllable environment for the tissue-receiving enclosures; and
orients and rotates the enclosures enabling a preferred distribution of substances within the enclosures. said chamber assemblies.

Tissue-receiving enclosure 100, in conjunction with a suitable fluidic-control system, such as is described in U.S. patent application Ser. No. 10/139,766, provides a system that is useful, among other functions, for investigating compound absorption (i.e., compound-membrane interactions). Some variations of this system provide a capability of investigating compound-membrane interactions under programmable and controlled-variable sequences, timing, rate/intensities and chemical/physical conditions, including, without limitation:

| | |
|---|---|
| Range of pH | Temperature of fluids, gases and environment |
| Range of compound concentrations | Mixture of gases for perfusion |
| Rate of perfusion | Range of ionic buffer strength |
| Rate of aeration | |

Illustrative compound-membrane interactions, and a method for studying them using the illustrative system, are described below.

In un-everted intestinal segment, the mucosal side faces inner chamber 150 and the serosal side faces outer chamber 152. If the intestinal tissue is everted, the reverse is true. One of the chambers will be a "supply" chamber and the other a "receiving" chamber, thereby defining the direction of the flux of the compound being studied. Either chamber can serve as a supply chamber (or a receiving chamber).

When the mucosal side of the intestinal tissue faces the supply chamber, the flux of the compound being studied propagates from the mucosal side of the tissue to the serosal side (mucosal→serosal flux). This is the same as occurs in vivo, wherein the transported compound moves through the brush border membrane and baso-lateral membrane of the cells of the intestinal mucosa before reaching the underlying capillaries of the submucosa.

To study compound absorption, the compound under investigation is provided in a buffer solution and is delivered, via one of tubes 136, to inner chamber 150. Simultaneously, outer chamber 152, which is functioning as a receiving chamber, is filled with the same buffer solution, without the compound, via one of tubes 134. This arrangement is used to study compound flux from inner chamber 150 to outer chamber 152. Another of the tubes 134 and 136 supplies a gas mixture (usually oxygen and carbon dioxide at a volumetric ratio of 95:5), which is necessary for various reasons, such as tissue oxygenation, compound active transport, mixing of solutions, and for reducing the affect of an unstirred water layer on compound absorption.

In some other variations of a method in accordance with the illustrative embodiment, the compound under investigation is introduced only into the receiving chamber, in this case outer chamber 152, for a back-flux study (serosa→mucosal flux) into the supply chamber (inner chamber 150).

A mother chamber can be used to maintain constant temperature, which is usually in the range of body temperature, during experimentation. Incubation time, which depends on the nature of compound under investigation, its transport mechanism, binding, metabolic, and other characteristics, should be optimized experimentally for each compound in known fashion.

At the end of incubation and/or during the incubation cycle, samples of the buffer/compound solution are taken from the receiving chamber (and feed chamber, if desired), through a tube that is aspirating. The samples are then analyzed using known analytical methods. An increase in compound concentration in the receiving chamber characterizes the compound's absorption or trans-membrane transport. This method can be used for absorption screening of different types of compounds (e.g., drugs, nutrients, nutraceuticals, cosmetics, cosmeceuticals, or other xenobiotics, etc.) that might use different mechanisms for their transport through live tissues.

To evaluate compound accumulation in tissue, intestinal segment 127 is removed from tissue-receiving enclosure 100, rinsed with buffer solution, and homogenized in an appropriate solution or dissolved in 1 M sodium hydroxide. The compound is then further extracted and tested using appropriate analytical methods in known fashion. After completion of each individual study, enclosures 100 are taken apart, washed and, if necessary, sterilized following standard GLP requirements. When testing lipophilic compounds, a wash with 10 percent or 50 percent soap solution (e.g., Ivory® brand liquid soap, Proctor and Gamble Co., etc.) is recommended. In some variations of the illustrative embodiment, disposable multi-chamber enclosures are used to simplify and accelerate testing processes.

In addition to its utility for studying compound-tissue interactions, tissue-receiving enclosure 100 in accordance with the illustrative embodiment of the present invention is also useful for studying compound-compound interactions during absorption. These interactions are important since they are known, in some cases, to inhibit or enhance absorption. (For nutrient-nutrient, and nutrient-nutraceutical interactions and their affect on compound absorption, see, e.g., A. M. Ugolev et al., Brit. J. Nutr. 34:205–220 (1976); H. McCoy & M. A. Kenny. Magnesium Res. 9:185–203 (1996); C. R. Lynch. Nutr. Rev. 55:102–1010 (1997)). Furthermore, compound-compound interactions can affect organism immune functions (see, e.g., K. S. Kubena & D. N. McMurray. J. Amer. Diet. Assoc. 96:1156–1164 (1996)).

Perhaps more important than nutrient-nutrient and nutrient-nutraceutical interactions are drug-nutrient, drug-nutraceutical and especially drug-drug interactions (i.e., pharmaceutical synergism or antagonism). These types of interactions can decrease drug absorption, make some portion of the drug unavailable for absorption, or even increase a drug's toxic effects (see, e.g., R. R. Levine et al., Pharmacology. Drug Actions and Reactions. $6^{th}$ edition. The Parthenon Publishing Group. New York, London, 2000; B. N. Singh. Clin. Pharmacokinet. 37:213–255 (1999)).

To study compound interactions during their absorption using tissue-receiving enclosure 100, the tested compound (e.g., nutrient, drug, nutraceutical, cosmetic, cosmeceutical, or other xenobiotics, etc.) is injected alone or in different combinations with another compound (modifier) into the supply chamber and the concentration of the compound under investigation is monitored in the receiving chamber. The compounds under investigation and modifiers can belong to the same or different classes. That is, the compounds and modifiers are individually selected from the group consisting of, for example, drugs, nutrients, nutraceuticals, cosmetics, cosmeccuticals and xenobiotics, etc. In this manner, tissue-receiving enclosure 100 can be used to study the following interactions:

| | |
|---|---|
| drug-drug | drug-nutrient |
| drug-neutraceuticals | nutrient-nutrient, |
| nutraceutical-nutraceutical | nutrient-neutraceuticals |
| cosmetics-cosmetics | cosmeceutical-cosmeceutical |
| cosmetics-cosmeceuticals | xenobiotic interactions |

The same enclosure can be used for testing compound absorption sans modifier and in the presence of a modifier. In the latter case, compound absorption sans modifier is typically evaluated first as described above, then, after an appropriate wash, compound absorption in the presence of a modifier is tested. This methodology reduces the effect of membrane variability on compound absorption.

Enclosure 100 in accordance with the illustrative embodiment of the present invention has a variety of uses in addition to those already described. For example, a detailed analysis of compound concentration in the supply chamber, in tissue, and in the receiving chamber is important to evaluate compound transport mechanisms, especially to differentiate between passive and active transport mechanisms. These analyses are readily performed using the fluid control system in conjunction with enclosure 100.

Furthermore, analysis of compound concentrations in the supply and receiving compartments, as well as in tissue, is necessary to separately evaluate compound transport through apical membranes and baso-lateral membranes in polarized epithelial cells. The ratio between compound concentration in tissue and in supply chamber characterizes the intensity of compound transport through the apical membrane, and the ratio between compound concentrations in tissue and in receiving chamber is used to evaluate baso-lateral membrane transport. Analysis of the compound and its metabolites in the intestinal tissue is also used evaluating first-pass metabolism of the tested compound.

Also, enclosure 100 is useful for compound absorption gradient studies. In such studies, intestinal segments are obtained from different parts of the small intestine or colon.

Additionally, multiple samples can be obtained from tissue-receiving enclosure 100 during an absorption cycle, as is necessary for kinetics studies of compound absorption. Also, the ability to run a plurality of enclosures 100 in parallel is advantageous for a comparative analysis of the effect of compound concentration and incubation time on the compound interaction with intestinal tissue sample 128.

Moreover, tissue-receiving enclosure 100 can be used to study the role of cell excretion systems in compound absorption, given the presence of a P-glycoprotein pump located in the brush border membrane of intestinal epithelial cells (see, e.g., F. Thiebaut et al., Proc. Natl. Acad. Sci. USA 84:7735–7738 (1987); L. Barthe et al., Fundam. Clin. Pharmacol. 13:154–168 (1999)). Specifically, the kinetics of compound absorption can be investigated in the absence and presence of P-glycoprotein inhibitors in the supply chamber. The same approach is used to screen absorption enhancers and for conducting compound toxicity analysis.

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

We claim:

1. An article comprising:
   an enclosure having a first aperture and a second aperture;
   a tissue support have a third aperture and a fourth aperture, wherein said tissue support is disposed within and axially aligned with said enclosure along an axis coinciding with said first aperture, second aperture, third aperture, and said fourth aperture;
   a first feed fitting, wherein said first feed fitting is received by said first aperture and said third aperture;
   a first spring-biasing element, wherein said first spring-biasing element mechanically couples to said first feed fitting;
   a second feed fitting, wherein said second feed fitting is received by said second aperture and said fourth aperture; and
   a second spring-biasing element, wherein said second spring-biasing element mechanically couples to said second feed fitting; wherein:
      said first spring-biasing element, said first feed fitting, said second feed fitting and said second spring-biasing element are aligned with said axis.

2. The article of claim 1 wherein:
   said first spring-biasing element exerts a first force;
   said second spring-biasing element exerts a second force; and
   said first force and said second force collectively place said enclosure in compression.

3. The article of claim 1 wherein said enclosure comprises a first housing and a second housing, wherein said first and second housing are coupled to one another.

4. The article of claim 3 wherein:
   said first housing has a first end and a second end;
   said first housing collapses in a dome at said first end;
   said second housing has a third end and a fourth end;
   said second housing collapses in a dome at said fourth end; and
   said first housing and said second housing engage one another at said second end and third end.

5. The article of claim 4 wherein:
   said first aperture is disposed at an apex of said dome at said first end of said first housing; and
   said second aperture is disposed at an apex of said dome at said fourth end of said second housing.

6. The article of claim 1 wherein a section of intestinal tissue is coupled to said tissue support.

7. The article of claim 6 wherein:
   said region within said tissue support defines an inner chamber; and
   said region exterior to said section of intestinal tissue defines an outer chamber.

8. The article of claim 7 wherein:
   said first feed fitting has a first internal passageway and a second internal passageway; and
   said second feed fitting has a first internal passageway and a second internal passageway.

9. The article of claim 8 wherein:
   said first internal passageway of said first feed fitting and said first internal passageway of said second feed fitting is coupled to said inner chamber; and
   said second internal passageway of said first feed fitting and said second internal passageway of said second feed fitting is coupled to said outer chamber.

10. The article of claim 9 further comprising a conduit, wherein said conduit extends into said first internal passage way of said second feed fitting.

11. The article of claim 10, further comprising a plurality of tubes, wherein:
    said plurality of tubes are disposed within said conduit;
    at least one of said tubes extends from said conduit into said inner chamber; and
    at least one of said tubes passes through said second internal passageway and extends into said outer chamber.

12. The article of claim 1, further comprising a frame, wherein:
    said frame has two spaced-apart rails;
    said first spring-biasing element is coupled to one of said spaced-apart rails; and
    said second spring-biasing element is coupled to the other of said spaced-apart rails.

* * * * *